United States Patent [19]
Shibuya

[11] Patent Number: 4,680,654
[45] Date of Patent: Jul. 14, 1987

[54] LID LOCKING MECHANISM FOR AN AUTOMATIC TAPE CASSETTE LOADING AND UNLOADING APPARATUS

[75] Inventor: Kazunori Shibuya, Yokohama, Japan
[73] Assignee: Victor Company of Japan, Ltd., Japan
[21] Appl. No.: 657,359
[22] Filed: Oct. 3, 1984
[30] Foreign Application Priority Data
  Oct. 5, 1983 [JP] Japan .............................. 58-154668
[51] Int. Cl.[4] .............................................. G11B 15/00
[52] U.S. Cl. .................................. 360/96.5; 360/96.1; 360/93
[58] Field of Search ................... 360/96.1, 96.5, 96.6, 360/88, 90, 93

[56] References Cited
U.S. PATENT DOCUMENTS

| 4,13,294 | 11/1983 | Beijer | 360/97 |
| 4,087,844 | 5/1978 | Takahashi et al. | 360/93 |
| 4,208,681 | 6/1980 | Hatchett | 360/96.6 |
| 4,308,562 | 12/1981 | Negishi | 360/71 |
| 4,320,424 | 3/1982 | Murayama | 360/96.6 |

FOREIGN PATENT DOCUMENTS

| 0070962 | 5/1980 | Japan | 360/96.5 |
| 0113165 | 9/1980 | Japan | 360/96.6 |
| 0191466 | 6/1983 | Japan | 360/93 |
| 0164050 | 9/1983 | Japan | 360/93 |

Primary Examiner—John H. Wolff
Assistant Examiner—Andrew L. Sniezek
Attorney, Agent, or Firm—Roberts, Spiecens & Cohen

[57] ABSTRACT

A lid locking mechanism for a lid of an automatic tape cassette loading and unloading apparatus, comprises a locking member which moves downwardly in relation to a tape cassette loading operation so as to oppose a rear surface of the lid and lock the lid in a closed position. The lid locking mechanism prevents an erroneous operation of loading a tape cassette into a recording and/or reproducing apparatus when another tape cassette is already loaded into the recording and/or reproducing apparatus.

6 Claims, 8 Drawing Figures

LID LOCKING MECHANISM FOR AN AUTOMATIC TAPE CASSETTE LOADING AND UNLOADING APPARATUS

BACKGROUND OF THE INVENTION

The present invention generally relates to lid locking mechanisms for a lid of an automatic tape cassette loading and unloading apparatus, and more particularly to a lid locking mechanism which locks the lid in a closed state when a tape cassette is loaded into a recording and/or reproducing apparatus, so as to prevent an erroneous operation of loading a tape cassette into the recording and/or reproducing apparatus when another tape cassette is already loaded into the recording and/or reproducing apparatus.

Automatic tape cassette loading and unloading apparatuses are known. Among such automatic tape cassette loading and unloading apparatuses, there is an automatic tape cassette loading an unloading apparatus applied to the so-called front loading type recording and/or reproducing apparatus. The front loading type recording and/or reproducing apparatus has a tape cassette inserting opening provided in a front panel thereof. The tape cassette inserting opening has a horizontally elongated shape. When a tape cassette is partly inserted into the tape cassette inserting opening, a motor starts so as to automatically carry and load the tape cassette into a loaded position within the recording and/or reproducing apparatus. On the other hand, when a tape cassette ejecting operation is carried out in a state where the tape cassette assumes the loaded position within the recording and/or reproducing apparatus, the motor starts so as to automatically unload the tape cassette from the loaded position and eject the tape cassette through the tape cassette inserting opening. Generally, the automatic tape loading and unloading apparatus is provided with a lid which covers the tape cassette inserting opening of the recording and/or reproducing apparatus. In order to enable downsizing of the recording and/or reproducing apparatus, the lid is rotatably supported along a top edge of the longer side of the horizontally elongated tape cassette inserting opening. Hence, the lid covers the tape cassette inserting opening when the lid assumes a vertically hanging position. On the other hand, the lid rotates inwardly towards the recording and/or reproducing apparatus up to a horizontal position, when opening the tape cassette inserting opening.

In the automatic tape cassette loading and unloading apparatus, a lid locking mechanism is provided with respect to the lid so as to lock the lid in the vertically hanging position, that is, in the closed position, when a tape cassette assumes the loaded position within the recording and/or reproducing apparatus. In other words, the lid locking mechanism is provided so as to prevent an erroneous operation of loading a tape cassette into the recording and/or reproducing apparatus when another tape cassette is already loaded into the recording and/or reproducing apparatus. When the lid locking mechanism locks the lid in the closed position, the lid will not open even when the lid is pushed from outside the recording and/or reproducing apparatus.

A conventional lid locking mechanism is designed to lock the lid in the closed position by use of locking pins. The locking pins move upwardly behind the lid in relation to the tape cassette loading operation, so as to project within the rotating path of the lid and prevent the lid from opening after a tape cassette is loaded into the apparatus. The locking pins move downwardly in relation to the tape cassette unloading operation, so as to recede from the rotating path of the lid and allow the lid to open when the tape cassette is being unloaded. Owing to this design, the following problems may occur when considering the operations an operator of the recording and/or reproducing apparatus may perform.

That is, when loading the tape cassette into the recording and/or reproducing apparatus, the operator may press his finger against the rear of the tape cassette and hence insert his finger within the tape cassette inserting opening, together with the tape cassette. In such a case, the timing with which the lid closes, is delayed because the finger of the operator will prevent the lid from closing. As a result, the locking pins will move upwardly and project within the rotating path of the lid before the lid assumes the closed position, and the lid will be positioned behind the locking pins when the finger of the operator is removed from the tape cassette inserting opening. In this case, the locking pins will not lock the lid in the closed position, and the lid is free to open. Therefore, the locking pins will not function so as to prevent the erroneous operation of loading a tape cassette into the recording and/or reproducing apparatus when another tape cassette is already loaded into the recording and/or reproducing apparatus. On the other hand, when the lid is positioned behind the locking pins as described above, the operator may insert his finger within the tape cassette inserting opening as the tape cassette is being unloaded from the recording and/or reproducing apparatus, because the lid is free to open. In this case, there is a danger in that the operator's finger may be pinched between a tape cassette holder and a top plate of the automatic tape cassette loading and unloading apparatus.

The conventional lid locking mechanism described heretofore is also disadvantageous in that the construction of the lid locking mechanism is complex and the manufacturing cost of the lid locking mechanism is high. When the conventional lid locking mechanism is to be applied to the existing automatic tape cassette loading and unloading apparatus, various design modifications must be made, and problems are introduced when actually assembling the lid locking mechanism with the automatic tape cassette loading and unloading apparatus.

SUMMARY OF THE INVENTION

Accordingly, it is a general object of the present invention to provide a novel and useful lid locking mechanism for a lid of an automatic tape cassette loading and unloading apparatus, in which the problems described heretofore are eliminated.

Another and more specific object of the present invention is to provide a lid locking mechanism for a lid of an automatic tape cassette loading and unloading apparatus, in which a locking member moves downwardly in relation to a tape cassette loading operation so as to oppose a rear surface of the lid and lock the lid in a closed position. According to the lid locking mechanism of the present invention, the locking member will not oppose a front surface of the lid and will always opposite the rear surface of the lid so as to lock the lid in the closed position, even when the timing with which the lid closes is delayed. As described before, such a delay in the closing timing of the lid may occur when the operator presses his finger against the rear of a tape cassette and hence inserts his finger within a tape cassette inserting opening of a recording and/or reproducing apparatus, together with the tape cassette. As a result, an erroneous operation of loading a tape cassette into the recording and/or reproducing apparatus when another tape cassette is already loaded into the recording and/or reproducing apparatus, is positively prevented at the tape cassette inserting opening. Moreover, when a tape cassette is loaded into the recording and/or reproducing apparatus, the locking member positively locks the lid in the closed position, and the operator cannot insert his finger within the tape cassette inserting opening. Therefore, the lid locking mechanism ensures safe operations of the recording and/or reproducing apparatus, because there is no danger than the operator's finger may be pinched between a tape cassette holder and a top plate of the automatic tape cassette loading and unloading apparatus as in the case of the conventional lid locking mechanism described before.

Other objects and further features of the present invention will be apparent from the following detailed description when read in conjunction with the accompanying drawings.

BRIEF DESCRIPTION OF THE DRAWINGS

FIGS. 1 and 2 are a plan view with a part cut away and a front view, respectively showing an embodiment of a lid locking mechanism according to the present invention applied to an automatic tape loading and unloading apparatus;

FIGS. 3, 4, and 5 are side views respectively showing the lid locking mechanism shown in FIG. 1 in a state before a tape cassette is loaded, in a state after the tape cassette is loaded, and during a tape cassette ejecting operation.

DETAILED DESCRIPTION

First, description will be given with respect to an automatic tape cassette loading and unloading apparatus which is applied with a lid locking mechanism according to the present invention.

Figure 1:
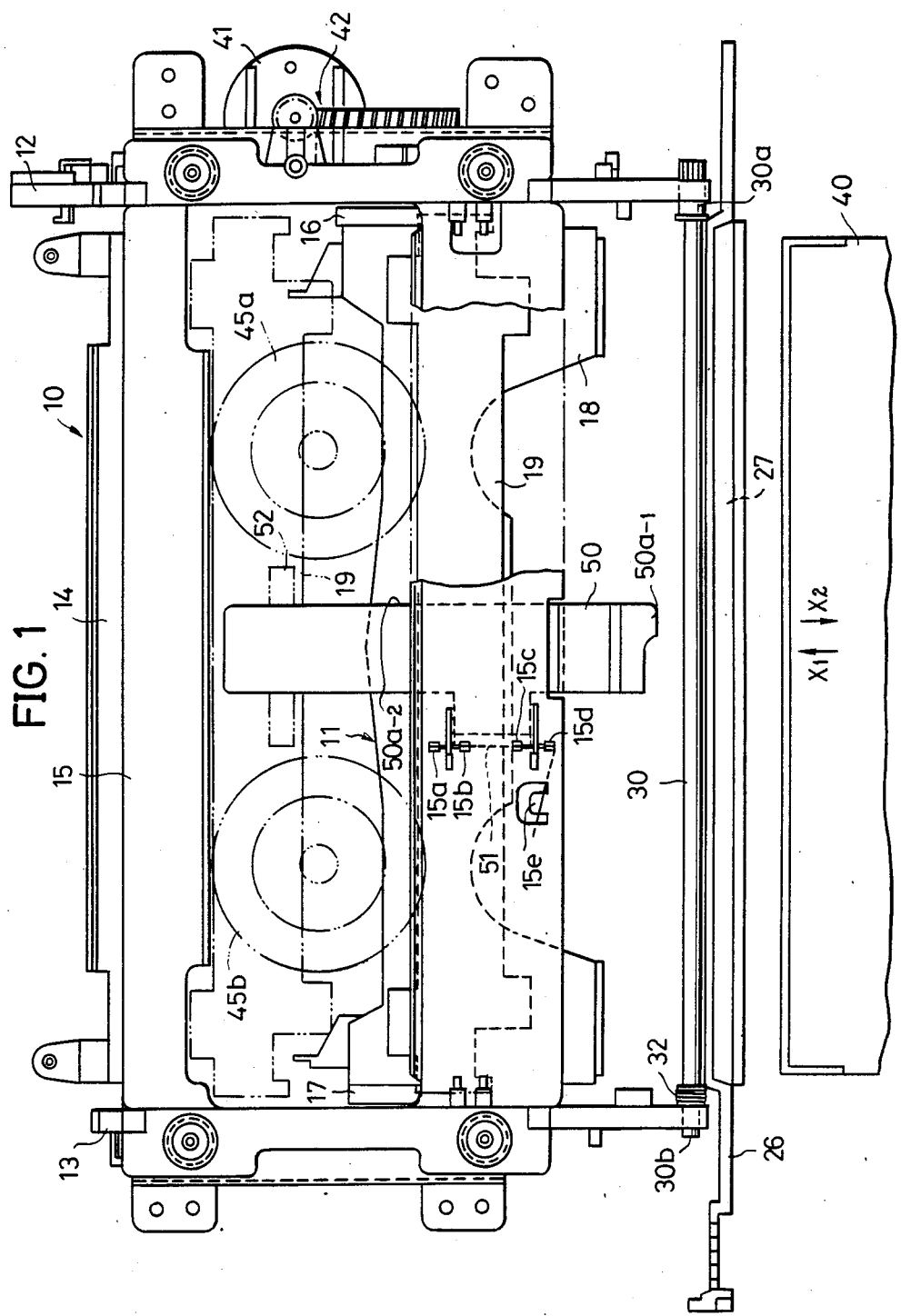
Figures 2, 3:
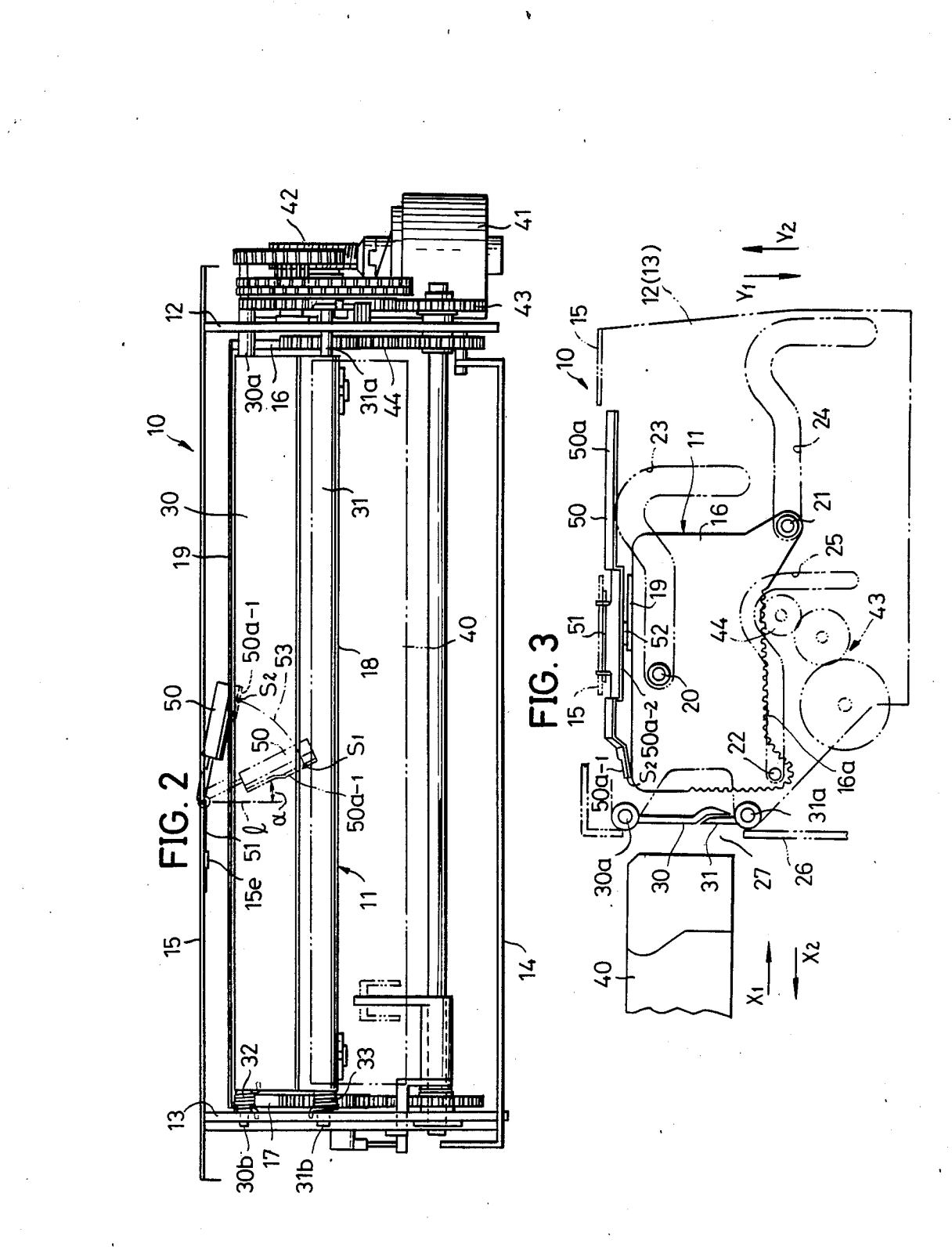

As shown in FIGS. 1 through 3, an automatic tape cassette loading and unloading apparatus 10 generally comprises a tape cassette holder 11, and a frame body which supports the tape cassette holder in a movable state. The frame body is made up of right and left vertical support plates 12 and 13, a bottom plate 14, and a top plate 15. The apparatus 10 is mounted on a chassis (not shown) of a recording and/or reproducing apparatus (not shown). The construction of the apparatus 10 is essentially the same as the construction disclosed in a U.S. patent application Ser. No. 573,874 filed Jan. 25, 1984 and entitled TAPE CASSETTE LOADING DEVICE IN A MAGNETIC RECORDING AND/OR REPRODUCING APPARATUS, in which application the assignee is the same as the assignee of the present application. Accordingly, detailed description on the apparatus 10 will be omitted in the present application.

The holder 11 is a frame body made up of right and left side plates 16 and 17, a lower cassette support plate 18, and a top plate 19. A tape cassette is inserted into the holder 11. As shown in FIG. 3, rollers 20 and 21 and a pin 22 which are located on the outer surface of the side plate 16, are guided an supported by respective substantially L-shaped guide grooves 23, 24, and 25 which are formed in the vertical support plate 12. Two rollers (not shown) and a pin (not shown) are guided and supported by respective substantially L-shaped guide grooves (not shown) which are formed in the vertical support plate 13. Hence, the holder 11 moves under such guidance and support. As shown in FIGS. 1 through 3 in solid lines, the holder 11 initially assumes a position opposing a tape cassette inserting opening 27 in a front panel 26 of the recording and/or reproducing apparatus.

A lid mechanism is provided at the inserting opening 27. This lid mechanism comprises an upwardly rotatable main lid 30 and a downwardly rotatable auxiliary lid 31. The main lid 30 has pins 30a and 30b provided on both sides in the vicinity of the upper end thereof, and the pins 30a and 30b are supported by the respective vertical support plates 12 and 13. The main lid 30 is urged to rotate clockwise in FIG. 3 by the action of a torsion spring 32. Thus, in a normal state, the main lid 30 assumes a vertically hanging position, that is, a closed position, so as to cover the inserting opening 27. The auxiliary lid 31 has pins 31a and 31b provided on both sides in the vicinity of the lower end theroef, and the pins 31a and 31b are supported by the respective vertical support plates 12 and 13. The auxiliary lid 31 is urged to rotate counterclockwise in FIG. 3 by the action of a torsion spring 33. Hence, in the normal state, the auxiliary lid 31 assumes a vertically upright position, that is, the closed position, and overlaps a lower front surface of the main lid 30. An indication means (not shown) which indicates that a tape cassette is loaded into the recording and/or reproducing apparatus, is provided on the lower front surface of the main lid 30. However, in the normal state where no tape cassette is loaded into the recording and/or reproducing apparatus, the indication means on the main lid 30 is covered by the auxiliary lid 31.

When a tape cassette 40 is inserted in a direction $X_1$ into the inserting opening 27 in the state shown in FIGS. 1 through 3, the front of the inserted tape cassette 40 pushes and opens the main and auxiliary lids 30 and 31, as the tape cassette 40 enters within the holder 11. Hence, the main lid 30 is rotated counterclockwise in FIG. 3 against the action of the torsion spring 32, and the auxiliary lid 31 is rotated clockwise in FIG.3 against the action of the torsion spring 33. When the tape cassette 40 is inserted up to an innermost part of the holder 11, a microswitch (not shown) is turned ON, and a motor 41 is started. The rotational force of the motor 41 is transmitted to a pinion 44, through a worm gear mechanism 42 a gear mechanism 43, or the like. The pinion 44 meshes with a rack 16a which is formed on the outer periphery of the side plate 16. The rotational force of the motor 41 is also transmitted to a pinion which meshes with a rack (not shown) which is formed on the outer periphery of the side plate 17, through similar gear mechanisms (not shown). As a result, the holder 11 is guided by the guide grooves 23, 24, and 25 of the vertical support plate 12 and the guide grooves of the vertical support plate 13, and moves together with the tape cassette 40. The holder 11 first moves horizontally in the direction $X_1$, then moves obliquely upwards to a position shown in FIG. 5, and thereafter moves downwardly in a direction $Y_L$ to a loaded position shown in chain dotted outline in FIG. 1 and in solid lines in FIG. 4. In the loaded position, reel driving shafts 45a and 45b of the recording and/or reproducing apparatus engage with respective reels of the tape cassette 40, as shown in FIG. 1.

Figure 4:
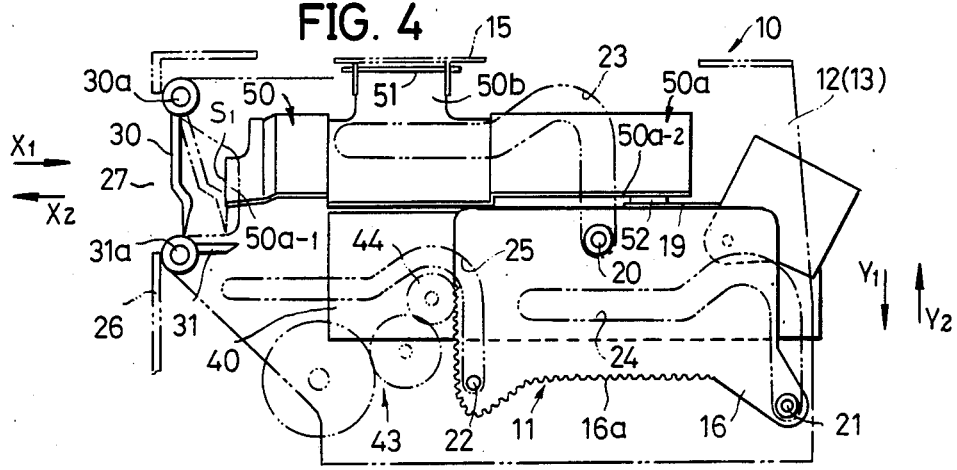

As shown in FIG. 4, the auxiliary lid 31 is maintained in the horizontal position as the tape cassette 40 is lowered to the loaded position. On the other hand, after the tape cassette 40 is inserted into the holder 11 through the inserting opening 27, the main lid 30 rotates clockwise in FIG. 4 and returns to the vertically hanging position by the action of the torsion spring 32, as the tape cassette 40 is lowered to the loaded position. Although the main lid 30 rotationally returns to the vertically hanging position, the auxiliary lid 31 is maintained in the horizontal position, and for this reason, the indication on the lower front surface of the main lid 30 is visible and indicates that the tape cassette 40 is loaded into the recording and/or reproducing apparatus.

When a tape cassette ejecting operation is performed, the motor 41 rotates in a reverse direction. As a result, the holder 11 is first raised in a direction $Y_1$, is then moved past the position shown in FIG. 5, and is thereafter moved horizontally in a direction $X_2$ to the initial position, so as to unload the tape cassette 40.

As the holder 11 is raised during the tape cassette unloading operation, the main lid 30 rotates counterclockwise in FIG. 4 against the action of the torsion spring 32, and uncovers the inserting opening 27. When the tape cassette 40 is ejected through the inserting opening 27, the auxiliary lid 31 rotates counterclockwise in FIG. 4 by the action of the torsion spring 33, and the main lid 30 rotates clockwise in FIG. 4 by the action of the torsion spring 32. In other words, the main and auxiliary lids 30 and 31 rotationally return to the respective closed positions, so as to cover the inserting opening 27 as shown in FIG. 3.

Next, description will be given with respect to a lid locking mechanism according to the present invention, by referring to FIGS. 6A, 6B, and 6C. The lid locking mechanism is designed to lock the main lid 30 in the closed position, so as to prevent an erroneous operation of loading a tape cassette into the recording and/or reproducing apparatus when another tape cassette is already loaded into the recording and/or reproducing apparatus.

Figure 6C:
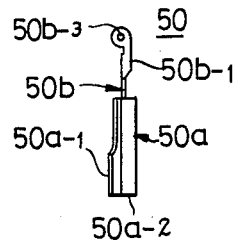
FIGS. 6A, 6B and 6C are a plan view, a front view, and a side view, respectively showing a locking plate which constitutes an essential part of the lid locking mechanism according to the present invention.
Figure 6A:
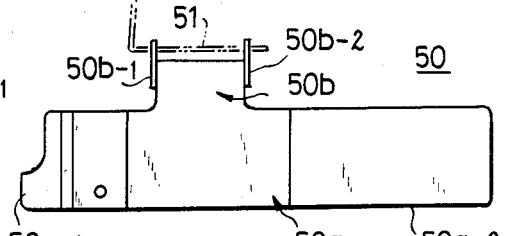
Figure 6B:
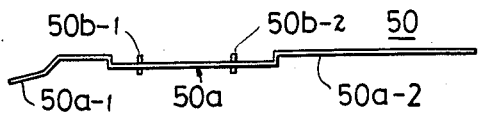

As shown in FIGS. 6A through 6C, a locking plate 50 has an approximate T-shape, and comprises an elongated main locking plate body 50a and a short arm 50b. The main locking plate body 50a has a stepped shape as shown in FIG. 6B, and has an engaging part 50a-1 on the tip end thereof.

Bent portions 50b-1 and 50b-2 are provided on both sides of the arm 50b, and a hole 50b-3 is formed in each of the bent portions 50b-1 and 50b-2. A rod 51 extends along the same direction as the tape cassette inserting direction $X_1$. The rod 51 is fixed to the lower surface of the top plate 15 so that the rod 51 will not move in the directions $X_1$ and $X_2$. The horizontal leg portion of rod 51 penetrates through the holes 50b-3 in the bent portions 50b-1 and 50b-2. Hence, the engaging part 50a of the locking plate 50 is rotatable about the rod 51 i.e. perpendicular to the tape cassette inserting direction $X_1$. As shown in FIG. 1, the horizontal leg portion of rod 51 penetrates through cut-and-bent parts 15a through 15d of the top plate 15 whereas the other leg portion of rod 51 engages with another cut-and-bent part 15e of the top plate 15. The rod 51 is arranged at a position slightly offset to the left from the center of the holder 11 with respect to the right and left sides of the holder 11, due to the shape of the locking plate 50, so that the engaging part 50a-1 of the locking plate 50 opposes the rear surface of the main lid 30 at an approximate center with respect to the right and left sides of the main lid 30.

In other words, the locking plate 50 is supported on the top plate 15 in a state where the locking plate 50 can rotate clockwise in FIG. 2 about the rod 51 due to its own weight.

In addition, an elongated receiving plate 52 made of a synthetic resin, is mounted on the top plate 19 of the holder 11, at a position opposing an edge part 50a-2 which extends on the opposite side of the arm 50b with respect to the the main locking plate body 50a. The receiving plate 52 prevents a large mechanical noise from being generated when the locking plate 50 makes contact with the top plate 19 of the holder 11.

Next, description will be given with respect to the operation of the locking plate 50. In a state before the tape cassette 40 is loaded into the recording and/or reproducing apparatus, the locking plate 50 assumes the state shown in FIGS. 1 through 3. In other words, the locking plate 50 is engaged by the top plate 19 of the holder 11, and is rotated to a substantially horizontal inoperative position $S_2$. In this inoperative position $S_2$, the engaging part 50a-1 is positioned above the main lid 30 and cannot engage the main lid 30 which rotates. Accordingly, the main lid 30 can rotate counterclockwise in FIG. 3 without interference from the engaging part 50a-1. Thus, when the tape cassette 40 is inserted through the inserting opening 27, the front of the inserted tape cassette 40 pushes and rotates the main lid 30 counterclockwise in FIG. 3 so as to uncover the inserting open 27, and the tape cassette 40 is inserted into the holder 11. As indicated by a two-dot chain line in FIG. 5, the main lid 30 is temporarily held in a substantially horizontal position by the upper surface of the inserted tape cassette 40. In this state, the engaging part 50a-1 is positioned above the main lid 30 which is temporarily held in the substantially horizontal position. The tip end of the main locking plate body 50a has a stepped shape in the side view as shown in FIG. 5, and follows along the main lid 30 which assumes the substantially horizontal position, so that the main lid 30 can rotate counterclockwise in FIG. 5 by a maximum amount without making contact with the main locking plate body 50a.

Figure 5:
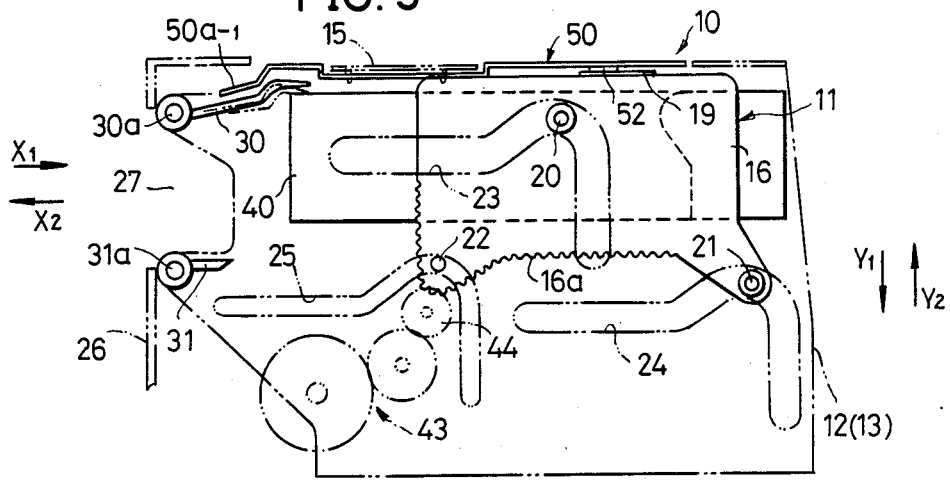

When the holder 11 moves downwardly in the direction $Y_1$ from the position shown in FIG. 5, together with the tape cassette 40, the main lid 30 rotates clockwise by the action of the torsion spring 32 as the tape cassette 40 moves downwardly. The main lid 30 disengages from the upper surface of the tape cassette 40 before the tape cassette 40 assumes the loaded position where the reel driving shafts 45a and 45b of the recording and/or reproducing apparatus engage the respective reels of the tape cassette 40. As a result, the main lid 30 rotates to the vertically hanging position (closed position) so as to cover the inserting opening 27 as shown in FIG. 4. The locking plate 50 rotates clockwise in FIG. 2 due to its own weight as the holder 11 moves downwardly, while the edge part 50a-2 is engaged by the receiving plate 52. The engaging part 50a-1 moves downwardly along an arcuate locus 53 shown in FIG. 2. The engaging part 50a-1 follows the rotational movement of the main lid 30, and will not move faster than the main lid 30.

When the tape cassette 40 reaches the loaded position shown in FIG. 4, the locking plate 40 rotates clockwise in FIG. 2 to an operative position $S_1$. In this operative position $S_1$, the locking plate 50 inclined at an angle $\alpha$ (approximately 25°) with respect to a vertical line l, as indicated by a two-dot chain line in FIG. 2 and by a solid line in FIG. 4. Further, the engaging part 50a-1 assumes a position slightly separated from and opposing the rear surface of the main lid 30. Accordingly, even when the main lid 30 is pushed in the direction $X_1$ from outside the recording and/or reproducing apparatus, the main lid 30 will be engaged by the engaging part 50a-1 when the main lid 30 is slightly rotated counterclockwise up to a position indicated by a two-dot chain line in FIG. 4. Thus, in this state, the main lid 30 is locked in the closed position and is prevented from uncovering the inserting opening 27.

Next, description will be given with respect to the operation of the locking plate 50 in a case where the timing with which the main lid 30 closes is delayed. Such a delay in the closing timing of the main lid 30 may occur when the operator presses his finger against the rear of the tape cassette 40 and hence inserts his finger within the inserting opening 27 of the recording and/or reproducing apparatus, together with the tape cassette 40.

When the main lid 30 is rotated counterclockwise up to the substantially horizontal position shown in FIG. 5 as the tape cassette 40 is inserted into the holder 11, the locking plate 50 assumes the inoperative position $S_2$ above the main lid 30. The locking plate 50 is maintained in the inoperative position $S_2$ unless the main lid 30 is rotated clockwise in FIG. 5. When the main lid 30 rotates clockwise in FIG. 5, the locking plate 50 follows the rotational movement of the main lid 30 and rotates clockwise in FIG. 2. Accordingly, even when the closing timing of the main lid 30 is delayed, the locking plate 50 will always follow the rotational movement of the main lid 30, and the engaging part 50a-1 will always assume the operative position $S_1$ when the main lid 30 reaches the closed position so as to prevent the main lid 30 from uncovering the inserting opening 27.

Therefore, when an attempt is made to insert another tape cassette through the inserting opening 27 in a state where the tape cassette 40 is already loaded into the recording and/or reproducing apparatus, the insertion of the other tape cassette is prevented at the inserting opening 27. Thus, it is possible to positively prevent the erroneous operation of loading a tape cassette into the recording and/or reproducing apparatus when another tape cassette is already loaded into the recording and/or reproducing apparatus.

In addition, when the tape cassette 40 is already loaded into the recording and/or reproducing apparatus, the main lid 30 will not open. Hence, it is impossible to insert a finger or the like into the recording and/or reproducing apparatus through the inserting opening 27. This means that the tape cassette ejecting operation will never be performed in a state where a finger or the like is inserted within the inserting opening 27, and it is possible to ensure safe operations of the recording and/or reproducing apparatus.

Further, when the holder 11 moves upwardly in the direction $Y_2$ responsive to the tape cassette ejecting operation, the edge part 50a-2 of the locking plate 50 is engaged and pushed upwardly by the receiving plate 52. As a result, the locking plate 50 is rotated counterclockwise in FIG. 2, and the engaging part 50a-1 rotates upwardly along the arcuate locus 53 so as to recede from the rear of the main lid 30. When the holder 11 reaches the uppermost position, the locking plate 50 assumes the substantially horizontal inoperative position $S_2$ as shown in FIG. 5, and the main lid 30 rotates counterclockwise without being blocked by the engaging part 50a-1 so as to uncover the inserting opening 27.

During the tape cassette ejecting operation, the receiving plate 52 engages the plate 50 at extending part 50a -2 remote from engaging part 50a-1 as evident from FIG. 4.

The locking plate 50 rotates counterclockwise in FIG. 2 as the edge part 50a-2 slides on top of the receiving plate 52 and moves obliquely upwards towards the right in FIG. 2. The angle $\alpha$ the locking plate 50 makes with the vertical line l, is set so that the edge part 50a-2 can smoothly slide on top of the receiving plate 52. In addition, no mechanical noise is generated because the edge part 50a-2 slides on top of the receiving plate 52 which is made of the synthetic resin.

The engaging part 50a-1 moves upwardly as the locking plate 50 recedes from the operative position $S_1$. Hence, even when the main lid 30 is rotated as indicated by a two-dot chain line in FIG. 4 and is pushing against the engaging part 50a-1, the engaging part 50a-1 does not push back the main lid 30 in the direction $X_2$ but moves in a direction which is similar to the direction in which the main lid 30 is pushed. Accordingly, even when the tape cassette ejecting operation is performed in a state where the operator is pushing the main lid 30 in the direction $X_1$, the locking plate 50 rotates in a relatively smooth manner and reaches the inoperative position $S_2$ responsive to the upward movement of the holder 11. Thus, the locking of the main lid 30 by the locking plate 50 is cancelled appropriately.

The lid lock mechanism described heretofore is mainly constituted by the locking plate 50. For this reason, the construction of the lid locking mechanism is simple and the lid locking mechanism can be manufactured at a low cost. Moreover, it requires only a slight design modification to apply the lid locking mechanism to an automatic tape cassette loading an unloading apparatus.

In the lid locking mechanism described heretofore, the locking plate 50 moves to the operative position $S_1$ where the engaging part 50a-1 can engage the main lid 30, by using the weight of the locking plate 50 itself. However, the locking plate 50 may be loaded with a torsion coil spring which urges the locking plate 50 to rotate clockwise in FIG. 2. In this case, the locking plate 50 will move to the operative position $S_1$ by the action of the torsion coil spring. The use of the torsion coil spring is advantageous in that the locking plate 50 will operate in a normal manner even when the recording and/or reproducing apparatus is used in an upright state, for example.

In the embodiment described heretofore, the engaging part 50a-1 is designed to move upwardly and downwardly along the arcuate locus 53. However, the present invention is not limited to this embodiment, and the engaging part 50a-1 may be designed to move upwardly and downwardly along a linear locus.

Further, the present invention is not limited to these embodiments, but various variations and modifications may be made without departing from the scope of the present invention.

What is claimed is:

1. A lid locking mechanism for a lid of an automatic tape cassette loading and unloading apparatus, said automatic tape cassette loading and unloading apparatus comprising a tape cassette inserting opening through which a tape cassette is inserted, said tape cassette inserting opening having a horizontally elongated shape, a lid for covering said tape cassette inserting opening in a vertically hanging position thereof and for uncovering said tape cassette inserting opening in a substantially horizontal position thereof, said lid being rotatable about an imaginary center line which extends along an upper edge of said tape cassette inserting opening, said lid assuming the substantially horizontal position when pushed by the tape cassette which is inserted through said tape cassette inserting opening, a tape cassette holder for accommodating and holding the tape cassette which is inserted through said tape cassette inserting opening, and holder moving means for moving said tape cassette holder between first and second positions, said tape cassette holder opposing said tape cassette inserting opening in said first position, said second position being lower than said first position, said lid locking mechanism comprising:

a rotatable locking member for locking said lid so as to prevent said lid from uncovering said tape cassette inserting opening when said rotatable locking member assumes a first rotational position, said rotatable locking member opposing a rear surface of said lid which is in the vertically hanging position and blocking said lid from rotating to the substantially horizontal position when said rotatable locking member assumes said first rotational position; and a support mechanism for rotatably supporting said rotatable locking member, said support mechanism being located at a position higher than said tape cassette inserting opening, said rotatable locking member having an edge remote from said support mechanism which rests on the tape cassette holder such that said rotatable locking member rotates upwardly to a second rotational position when the tape cassette holder moves to said first position, said rotatable locking member being eccentrically supported by said support mechanism such that said rotatable locking member moves to said first rotational position under its own weight when the tape cassette holder moves from the first position to the second position, said rotatable locking member being displaced from a position opposing the rear surface of said lid, which is in the vertically hanging position, when said rotatable locking member assumes said second rotational position.

2. A lid locking mechanism for a lid of an automatic tape cassette loading and unloading apparatus, said automatic tape cassette loading and unloading apparatus comprising a tape cassette inserting opening through which a tape cassette is inserted, said tape cassette inserting opening having a horizontally elongated shape, a lid for covering said tape cassette inserting opening in a vertically hanging position thereof and for uncovering said tape cassette inserting opening in a substantially horizontal position thereof, said lid being rotatable about an imaginary center line which extends along an upper edge of said tape cassette inserting opening, said lid assuming the substantially horizontal position when pushed by the tape cassette which is inserted through said tape cassette inserting opening, a tape cassette holder for accommodating and holding the tape cassette which is inserted through said tape cassette inserting opening, holder moving means for moving said tape cassette holder between first and second positions, said tape cassette holder opposing said tape cassette inserting opening in said first position, said second position being lower than said first position, right and left vertical support plates for movably supporting said tape cassette holder, and a top plate bridging said vertical support plates, said lid locking mechanism comprising:

a rotatable locking member for locking said lid so as to prevent said lid from uncovering said tape cassette inserting opening when said rotatable locking member assumes a first rotational position, said rotatable locking member opposing a rear surface of said lid which is in the vertically hanging position and blocking said lid from rotating to the substantially horizontal position when said rotatable locking member assumes said first rotational position, said rotatable locking member rotating upwardly to a second rotational position responsive to a movement of said tape cassette holder to the first position, said rotatable locking member being displaced from a position opposing the rear surface of said lid, which is in the vertically hanging position, when said rotatable locking member assumes said second rotational position; and a support mechanism for rotatably supporting said rotatable locking member, said support mechanism being located at a position higher than said tape cassette inserting opening, said support mechanism comprising a rod including a portion which extends in the same direction as an inserting direction of the tape cassette and said rod is mounted on said top plate, said rotatable locking member comprising a locking plate having an engaging part on a tip end thereof, said locking plate having one side edge thereof rotatably supported on said rod in a state where said locking plate is restricted from being displaced in an axial direction of said portion of said rod, said cassette holder comprising an engaging member for engaging another side edge of said locking plate, said locking plate rotating and assuming a downwardly inclined state due to the weight of said locking plate itself responsive to the movement of said tape cassette holder to the second position, said engaging part of said locking plate rotating downwardly within a predetermined plate perpendicular to the inserting direction of the tape cassette as said locking plate reaches said first rotational position, said locking plate rotating and assuming a substantially horizontal state responsive to the movement of said tape cassette holder to the first position, and said engaging part rotates upwardly in said predetermined plane as said locking plate reaches said second rotational position.

3. A lid locking mechanism as claimed in claim 2 in which said locking plate comprises a main locking plate body which is elongated in the inserting direction of the tape cassette, and an arm which extends sidewardly from said main locking plate body and is rotatably supported on said portion of said rod, said main locking plate body has an extending part in the vicinity of a rear end thereof, and said extending part is engaged by said engaging member of said cassette holder.

4. A lid locking mechanism as claimed in claim 3 in which said main locking plate body is bent in the vicinity of a front end thereof so as not to restrict said lid from rotating and assuming the substantially horizontal position when said rotatable locking member assumes said second rotational position.

5. A lid locking mechanism as claimed in claim 2 which said engaging member of said cassette holder comprises a receiving plate made of a synthetic resin, and said receiving plate is mounted on an upper part of said cassette holder at a position where said receiving plate is in contact with the other side edge of said locking plate.

6. A lid locking mechanism as claimed in claim 1 wherein said locking member forms an angle with the vertical in said first rotational position.

* * * * *